(12) United States Patent
Orlando et al.

(10) Patent No.: US 7,513,103 B2
(45) Date of Patent: Apr. 7, 2009

(54) GAS TURBINE ENGINE ASSEMBLY AND METHODS OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 588 days.

(21) Appl. No.: 11/254,016

(22) Filed: Oct. 19, 2005

(65) Prior Publication Data
US 2007/0084188 A1    Apr. 19, 2007

(51) Int. Cl.
F02K 3/00    (2006.01)

(52) U.S. Cl. ............... 60/268; 60/226.1; 60/39.162; 415/9

(58) Field of Classification Search ............ 60/228, 60/226.1, 39.162, 268; 415/9, 174.4; 416/2
See application file for complete search history.

(56) References Cited

U.S. PATENT DOCUMENTS

| | | | | |
|---|---|---|---|---|
| 3,729,957 A * | 5/1973 | Petrie et al. | ................. | 60/226.1 |
| 3,866,415 A * | 2/1975 | Ciokajlo | .................... | 60/226.1 |
| 4,005,575 A * | 2/1977 | Scott et al. | ................. | 60/226.1 |
| 4,251,987 A * | 2/1981 | Adamson | ..................... | 60/805 |
| 4,688,995 A * | 8/1987 | Wright et al. | ............... | 416/127 |
| 4,751,816 A * | 6/1988 | Perry | ........................ | 60/226.1 |
| 4,790,133 A * | 12/1988 | Stuart | ........................ | 60/226.1 |
| 4,827,712 A * | 5/1989 | Coplin | ...................... | 60/226.1 |
| 5,010,729 A | 4/1991 | Adamson et al. | | |
| 5,105,618 A * | 4/1992 | Lardellier | .................. | 60/226.1 |
| 5,274,999 A * | 1/1994 | Rohra et al. | ................ | 60/226.1 |
| 5,307,622 A * | 5/1994 | Ciokajlo et al. | ......... | 60/39.162 |
| 5,806,303 A | 9/1998 | Johnson | | |
| 5,809,772 A | 9/1998 | Giffin, III et al. | | |
| 5,813,214 A | 9/1998 | Moniz et al. | | |
| 5,867,980 A | 2/1999 | Bartos | | |
| 6,158,210 A * | 12/2000 | Orlando | ..................... | 60/226.1 |
| 6,381,948 B1 * | 5/2002 | Klingels | .................... | 60/226.1 |
| 6,619,030 B1 | 9/2003 | Seda et al. | | |
| 6,622,473 B2 * | 9/2003 | Becquerelle et al. | ....... | 60/226.1 |
| 6,684,626 B1 | 2/2004 | Orlando et al. | | |
| 6,711,887 B2 | 3/2004 | Orlando et al. | | |
| 6,732,502 B2 | 5/2004 | Seda et al. | | |
| 6,739,120 B2 * | 5/2004 | Moniz et al. | ............... | 60/226.1 |
| 6,763,652 B2 | 7/2004 | Baughman et al. | | |
| 6,763,653 B2 | 7/2004 | Orlando et al. | | |
| 6,763,654 B2 | 7/2004 | Orlando et al. | | |
| 7,195,447 B2 * | 3/2007 | Moniz et al. | ................. | 415/69 |
| 7,296,398 B2 * | 11/2007 | Moniz et al. | ................. | 60/268 |
| 2006/0090451 A1 * | 5/2006 | Moniz et al. | ............... | 60/226.1 |
| 2007/0084184 A1 * | 4/2007 | Orlando et al. | ............... | 60/204 |
| 2007/0084185 A1 * | 4/2007 | Moniz et al. | ................. | 60/204 |

(Continued)

Primary Examiner—William H Rodriguez
(74) Attorney, Agent, or Firm—William Scott Andes, Esq.; Armstrong Teasdale LLP

(57) ABSTRACT

A method for assembling a gas turbine engine includes coupling a low-pressure turbine to a core turbine engine, coupling a counter-rotating fan assembly including a forward fan assembly and an axially aft fan assembly to the low-pressure turbine such that the forward fan assembly rotates in a first direction and the aft fan assembly rotates in an opposite second direction, and coupling a booster compressor to the low-pressure turbine such that the booster compressor rotates in the first direction.

20 Claims, 4 Drawing Sheets

U.S. PATENT DOCUMENTS

| | | | |
|---|---|---|---|
| 2007/0084186 A1* | 4/2007 | Orlando et al. | 60/204 |
| 2007/0084187 A1* | 4/2007 | Moniz et al. | 60/204 |
| 2007/0084188 A1* | 4/2007 | Orlando et al. | 60/204 |
| 2007/0084189 A1* | 4/2007 | Moniz et al. | 60/204 |
| 2007/0084190 A1* | 4/2007 | Moniz et al. | 60/204 |
| 2007/0240399 A1* | 10/2007 | Orlando et al. | 60/39.162 |
| 2008/0098716 A1* | 5/2008 | Orlando et al. | 60/226.1 |

* cited by examiner

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine and a low-pressure turbine coupled together in a serial flow relationship. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine positioned aft of the high-pressure turbine. The low-pressure turbine includes a rotor assembly coupled to a fan using a drive shaft. The low-pressure turbine rotatably drives the fan through the drive shaft. To facilitate increasing engine efficiency, at least one known gas turbine engine includes a counter-rotating low-pressure turbine that is coupled to a counter-rotating fan and/or a counter-rotating booster compressor.

An outer rotating spool, a rotating frame, a mid-turbine frame, and two concentric shafts, are installed within the gas turbine engine to facilitate supporting the counter-rotating low-pressure turbine. The installation of the aforementioned components also enables a first fan assembly to be coupled to a first turbine and a second fan assembly to be coupled to a second turbine such that the first fan assembly and the second fan assembly each rotate in the same rotational direction as the first turbine and the second turbine, respectively. Accordingly, the overall weight, design complexity and/or manufacturing costs of such an engine are increased.

BRIEF DESCRIPTION OF THE INVENTION

In one aspect, a method for assembling a gas turbine engine is provided. The method includes coupling a low-pressure turbine to a core turbine engine, coupling a counter-rotating fan assembly including a forward fan assembly and an axially aft fan assembly to the low-pressure turbine such that the forward fan assembly rotates in a first direction and the aft fan assembly rotates in an opposite second direction, and coupling a booster compressor to the low-pressure turbine such that the booster compressor rotates in the first direction.

In another aspect, a counter-rotating fan assembly is provided. The counter-rotating fan assembly includes a forward fan assembly coupled to a low-pressure turbine, the forward fan assembly comprising a disk and a plurality of rotor blades coupled to the disk and configured to rotate in a first rotational direction, an aft fan assembly coupled to the low-pressure turbine, the aft fan assembly comprising a disk and a plurality of rotor blades coupled to the disk, the aft fan assembly configured to rotate in a second rotational direction, and a booster compressor coupled to the low-pressure turbine such that the booster compressor rotates in the first direction.

In a further aspect, a turbine engine assembly is provided. The turbine engine assembly includes a core gas turbine engine, a low-pressure turbine coupled to the core gas turbine engine, a counter-rotating fan assembly coupled to the core gas turbine engine comprising, a forward fan assembly coupled to the low-pressure turbine, the forward fan assembly comprising a disk and a plurality of rotor blades coupled to the disk and configured to rotate in a first rotational direction, and an aft fan assembly coupled to the low-pressure turbine, the aft fan assembly comprising a disk and a plurality of rotor blades coupled to the disk, the aft fan assembly configured to rotate in a second rotational direction, and a booster compressor coupled to the low-pressure turbine such that the booster compressor rotates in the first direction.

DETAILED DESCRIPTION OF THE INVENTION

Figure 1:
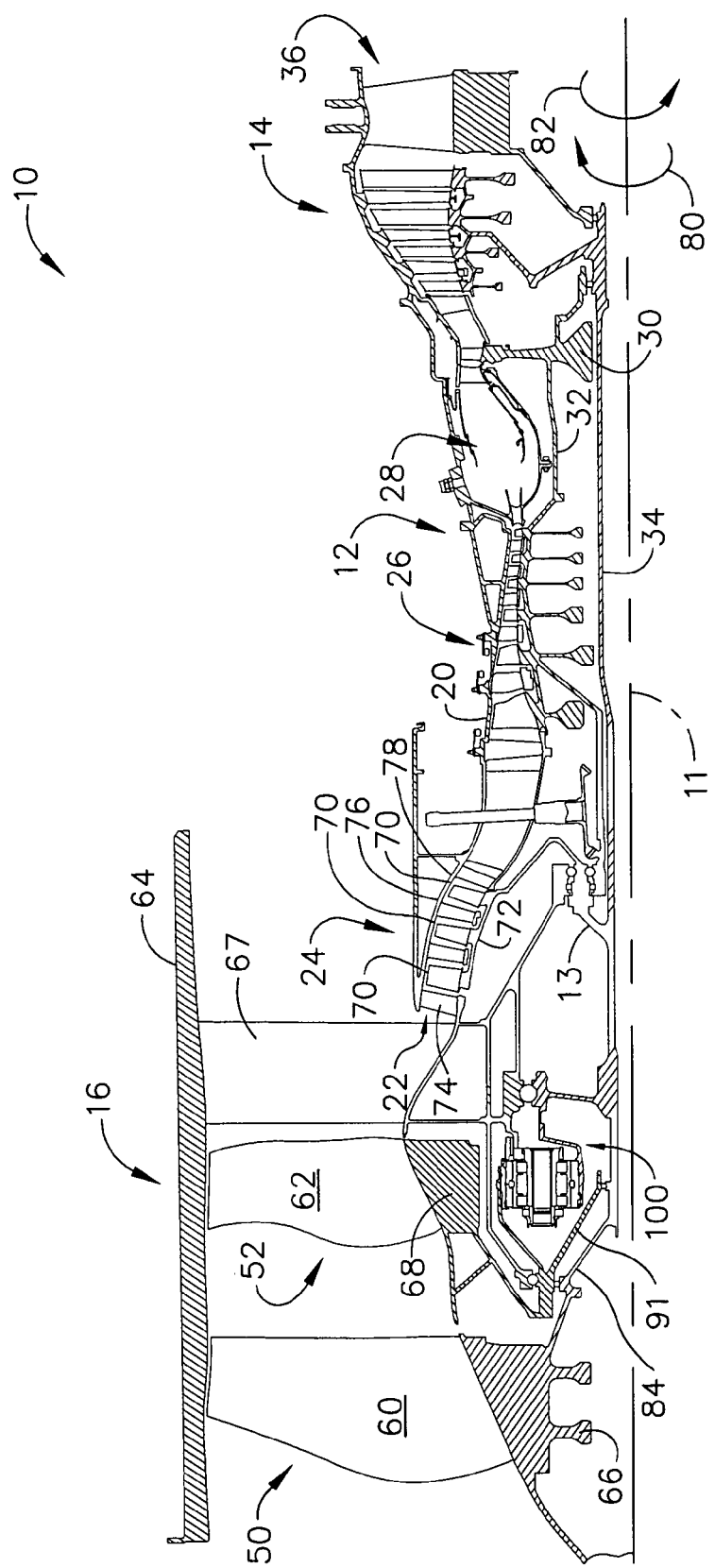
FIG. 1 is a cross-sectional view of a portion of an exemplary turbine engine assembly.

FIG. 1 is a cross-sectional view of a portion of an exemplary turbine engine assembly 10 having a longitudinal axis 11. In the exemplary embodiment, turbine engine assembly 10 includes a core gas turbine engine 12 generally defined by a frame 13. A low-pressure turbine 14 is coupled axially aft of core gas turbine engine 12 and a counter-rotating fan assembly 16 is coupled axially forward of core gas turbine engine 12.

Core gas turbine engine 12 includes an outer casing 20 that defines an annular core engine inlet 22. Casing 20 surrounds a low-pressure booster compressor 24 to facilitate increasing the pressure of the incoming air to a first pressure level. In one embodiment, core gas turbine engine 12 is a core CFM56 gas turbine engine available from General Electric Aircraft Engines, Cincinnati, Ohio.

A high-pressure, multi-stage, axial-flow compressor 26 receives pressurized air from booster compressor 24 and further increases the pressure of the air to a second, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first rotatable drive shaft 32, and then to second or low-pressure turbine 14 to facilitate driving counter-rotating fan assembly 16 and booster compressor 24 through a second rotatable drive shaft 34 that is coupled coaxially with first drive shaft 32. After driving low-pressure turbine 14, the combustion products leave turbine engine assembly 10 through an exhaust nozzle 36 to provide propulsive jet thrust.

Counter-rotating fan assembly 16 includes a first or forward fan assembly 50 and a second or an aft fan assembly 52 configured to rotate about longitudinal axis 11. The terms "forward fan" and "aft fan" are used herein to indicate that fan assembly 50 is coupled axially upstream from fan assembly 52. In one embodiment, fan assemblies 50 and 52 are positioned at a forward end of core gas turbine engine 12, as shown in FIG. 1. In an alternative embodiment, fan assemblies 50 and 52 are positioned at an aft end of core gas turbine engine 12. Fan assemblies 50 and 52 each includes at least one row of rotor blades 60 and 62, respectively, and are positioned within a nacelle 64. Rotor blades 60 are coupled to rotor disk 66 and rotor blades 62 are coupled to rotor disk 68.

In one embodiment, booster compressor 24 includes a plurality of rows of rotor blades 70 that are coupled to a respective rotor disk 72. Booster compressor 24 is positioned aft of an inlet guide vane assembly 74 and is coupled to drive shaft 34 such that booster compressor 24 rotates at a rotational speed that is substantially equal to a rotational speed of forward fan assembly 50. Although booster compressor 24 is shown as having only three rows of rotor blades 70, booster compressor 24 may have any suitable number and/or rows of rotor blades 70, such as a single row of rotor blades 70 or a plurality of rows of rotor blades 70 that are interdigitated with a plurality of rows of guide vanes 76. In one embodiment, inlet guide vanes 76 are fixedly or securely coupled to a booster case 78. In an alternative embodiment, rotor blades 70 are rotatably coupled to rotor disk 72 such that inlet guide vanes 76 are movable during engine operation to facilitate varying a quantity of air channeled through booster compressor 24. In another alternative embodiment, turbine engine assembly 10 does not include booster compressor 24.

In the exemplary embodiment, booster compressor 24 is coupled axially aft of a fan frame assembly 67 such that fan frame assembly 67 is positioned axially between booster compressor 24 and aft fan assembly 52. As shown in FIG. 1, low-pressure turbine 14 is coupled to forward fan assembly 50 and booster compressor 24 through shaft 34 such that forward fan assembly 50 and booster compressor 24 each rotate in a first rotational direction 80. Aft fan assembly 52 is coupled to drive shaft 34 and/or low-pressure turbine 14, via a gearbox 100, such that aft fan assembly 52 rotates in an opposite second rotational direction 82.

Figure 2:
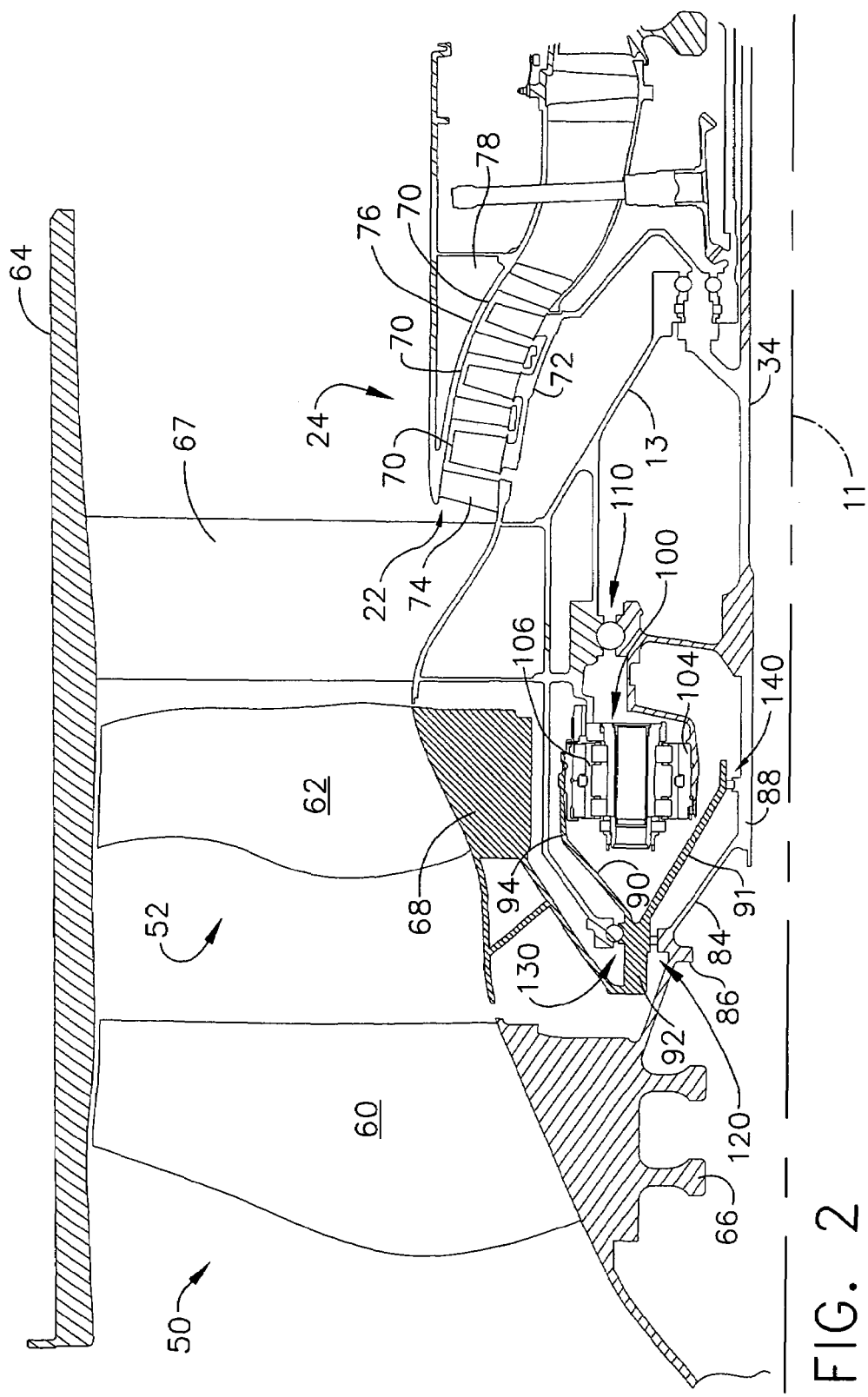
FIG. 2 is an enlarged cross-sectional view of a portion of a counter-rotating fan assembly shown in FIG. 1.
Figure 3:
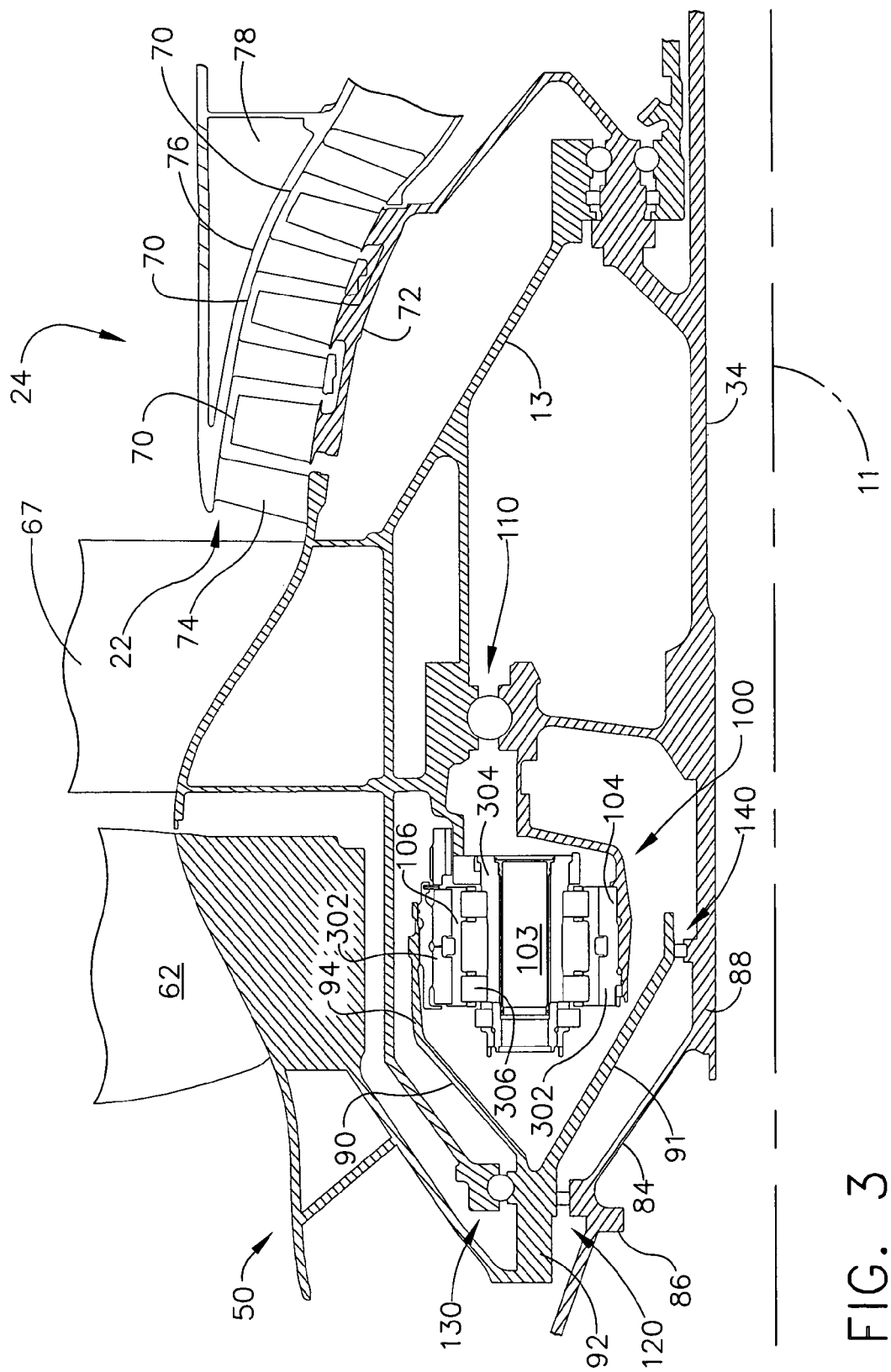
FIG. 3 is an enlarged cross-sectional view of a portion of the counter-rotating fan assembly shown in FIG. 2.

FIG. 2 is a schematic diagram of a portion of counter-rotating fan assembly 16 shown in FIG. 1. In one embodiment, forward fan assembly 50 includes a cone 84 positioned about longitudinal axis 11. Cone 84 is connected at a first or forward end 86 to rotor disk 66 and at a second or aft end 88 to drive shaft 34, as shown in FIG. 2. Aft fan assembly 52 includes a cone 90 positioned coaxially about at least a portion of cone 84 along longitudinal axis 11. Cone 90 is coupled at a first or forward end 92 to rotor disk 68 and at a second or aft end 94 to an output 106 of a gearbox 100. Cone 90 also includes an extension 91 that is coupled to forward end 92 and is configured to provide support to cone 90 via a bearing assembly 140 discussed further herein.

In one embodiment, counter-rotating fan assembly 16 also includes gearbox 100 that is coupled between aft fan assembly 52 and drive shaft 34 to facilitate rotating aft fan assembly 52 in an opposite rotational direction 82 with respect to rotational direction 80 in which forward fan assembly 50 rotates. Gearbox 100 has a generally toroidal shape and is positioned circumferentially about drive shaft 34 to extend substantially about drive shaft 34. As shown in FIG. 2, gearbox 100 includes a structural support 102, at least one gear 103 coupled within structural support 102, an input 104 coupled to drive shaft 34, and an output 106 coupled to aft fan assembly 52.

In one embodiment, gearbox 100 has a gear ratio of approximately 2.0 to 1 such that forward fan assembly 50 and booster compressor 24 each rotate at a rotational speed that is approximately twice the rotational speed of aft fan assembly 52. In another embodiment, forward fan assembly 50 and booster compressor 24 each rotate with a rotational speed that is between approximately 0.67 and approximately 2.1 times faster than the rotational speed of aft fan assembly 52. In this embodiment, forward fan assembly 50 and booster compressor 24 may rotate at a rotational speed greater than, equal to, or less than the rotational speed of aft fan assembly 52.

In one embodiment, a first bearing assembly, such as thrust bearing assembly 110 as shown in FIG. 2, is positioned about drive shaft 34 and/or longitudinal axis 11. Thrust bearing assembly 110 operatively couples and/or is mounted between drive shaft 34 and frame 13 of core gas turbine engine 12. In one embodiment, thrust bearing assembly 110 includes a radially positioned inner race 111 that is mounted with respect to drive shaft 34. Inner race 111 is mounted to a drive shaft extension 112 operatively coupled to drive shaft 34 so that inner race 111 is rotatable about longitudinal axis 11 with drive shaft 34. In one particular embodiment, drive shaft extension 112 is splined to drive shaft 34. Inner race 111 has a surface 113 defining an inner groove 114 of thrust bearing assembly 110. Surface 113 defining inner groove 114 has a generally arcuate profile.

Thrust bearing assembly 110 includes a radially positioned outer race 116 securely coupled to frame 13. In one embodiment, outer race 116 and/or frame 13 acts as a ground for the transfer of thrust loads and/or forces developed or generated by counter-rotating fan assembly 16 and/or booster compressor 24, as discussed in greater detail below. Outer race 116 has a surface 117, generally opposing surface 113, which forms an outer groove 118 of thrust bearing assembly 110. Surface 117 defining outer groove 118 has a generally arcuate profile. At least one roller element, such as a plurality of bearings 119, is movably positioned between inner race 111 and outer race 116. Each bearing 119 is in rolling contact with inner groove 114 and outer groove 118 to allow drive shaft 34 to rotate freely with respect to gearbox 100.

A second bearing assembly, such as thrust bearing assembly 120, is positioned radially about longitudinal axis 11. In one embodiment, thrust bearing assembly 120 operatively couples and/or is mounted between a forward end portion of forward fan assembly 50, such as at or near forward end 86 of cone 84, and a forward end portion of aft fan assembly 52, such as at or near forward end 92 of cone 90. In one embodiment, thrust bearing assembly 120 includes a radially positioned inner race 122 that is mounted with respect to an outer surface of cone 84. As shown in FIG. 2, inner race 122 is mounted to cone 84 so that inner race 122 is rotatable about longitudinal axis 11 with forward fan assembly 50. Inner race 122 has a surface 123 defining an inner groove 124 of thrust bearing assembly 120. Surface 123 defining inner groove 124 has a generally arcuate profile.

Figure 4:
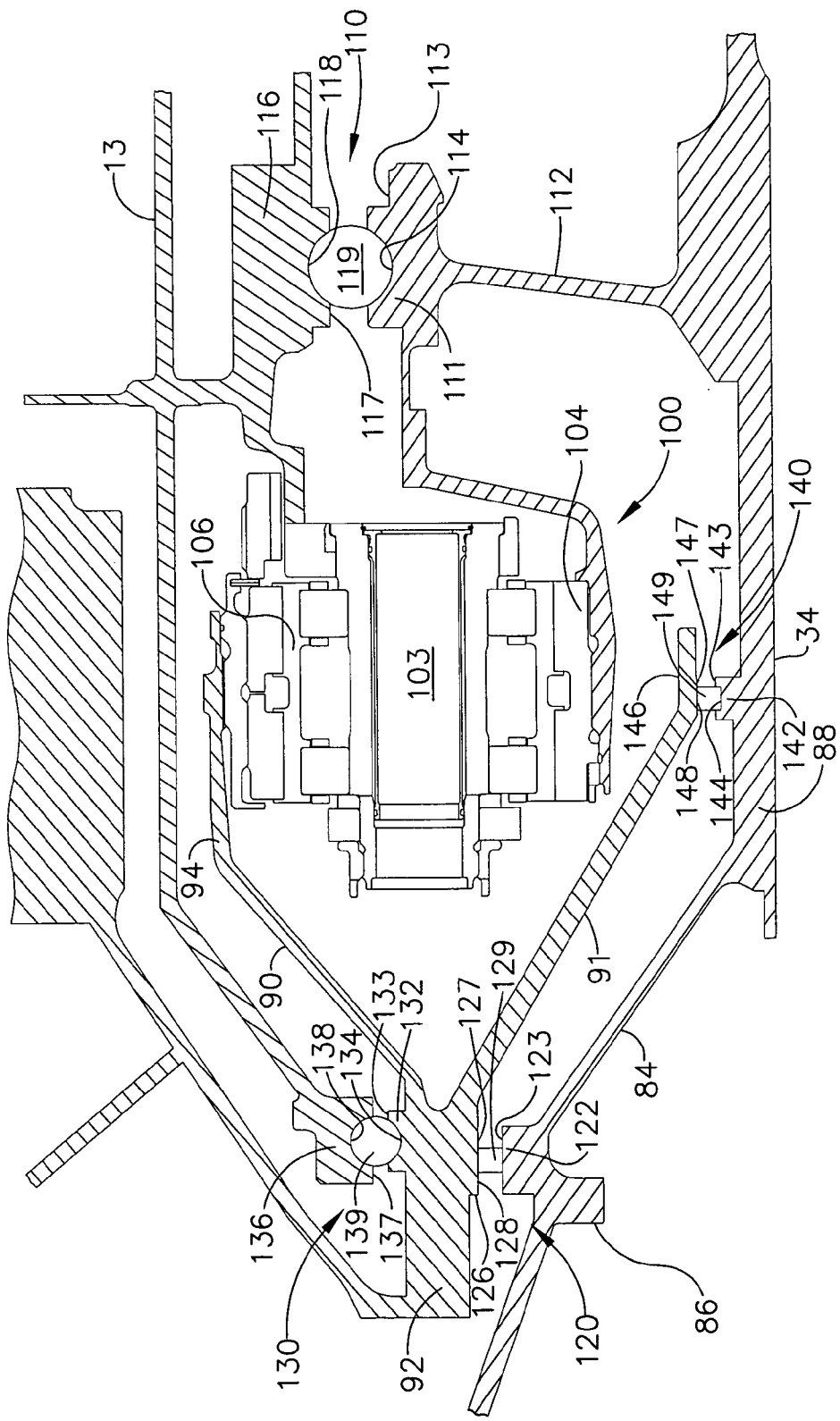
FIG. 4 is an enlarged cross-sectional view of a portion of the counter-rotating fan assembly shown in FIG. 2.

Bearing assembly 120 includes a radially positioned outer race 126 that is mounted with respect to an inner surface of cone 90. As shown in FIG. 4, inner race 122 is mounted to cone 90 so that outer race 126 is rotatable about longitudinal axis 11 with aft fan assembly 52. Outer race 126 has a surface 127, generally opposing surface 123, which forms an outer groove 128 of thrust bearing assembly 120. Surface 127 defining outer groove 128 has a generally arcuate profile. At least one roller element, such as a plurality of bearings 129, is movably positioned between inner race 122 and outer race 126. Each bearing 129 is in rolling contact with inner groove 124 and outer groove 128 to facilitate relative rotational movement of forward fan assembly 50 and/or aft fan assembly 52.

In one embodiment, bearing assemblies 110 and/or 120 facilitate maintaining forward fan assembly 50 and/or aft fan assembly 52 in a relatively fixed axial position. During operation of counter-rotating fan assembly 16, thrust loads and/or forces generated by forward fan assembly 50 and/or booster compressor 24 are transferred directly from forward fan assembly 50 to first thrust bearing assembly 110. Further, thrust loads and/or forces generated by aft fan assembly 52 during operation are transferred from aft fan assembly 52 to second thrust bearing assembly 120 and from second thrust bearing assembly 120 through drive shaft 34 to first thrust bearing assembly 110. As a result of transferring thrust loads and/or forces to thrust bearing assembly 110 and/or thrust bearing assembly 120, the transfer of thrust loads and/or forces through gearbox 100, operatively coupled to aft fan assembly 52, is prevented or limited. In alternative embodiments, any suitable bearing assembly known to those skilled in the art and guided by the teachings herein provided can be used for or in addition to bearing assembly 110 and/or bearing assembly 120.

In one embodiment, a bearing assembly, such as thrust bearing assembly 130, is positioned about the outer surface of cone 90 at or near forward end 92, as shown in FIG. 4. Thrust bearing assembly 130 is connected between frame 13 and forward end 92. In one embodiment, thrust bearing assembly 130 acts as a differential bearing assembly in combination with bearing assembly 120 to support aft fan assembly 52 and/or transfer thrust loads and/or forces from aft fan assembly 52 to frame 13. In one embodiment, thrust bearing assembly 130 includes an inner race 132 that is mounted with respect to cone 90, as shown in FIG. 4. Inner race 132 is mounted to forward end 92 of cone 90 so that inner race 132 is rotatable about longitudinal axis 11 with aft fan assembly 52. Inner race 132 has a surface 133 defining an inner groove 134 of roller bearing assembly 130.

Thrust bearing assembly 130 includes an outer race 136 that is securely coupled to frame 13. In one embodiment, outer race 136 is securely coupled with respect to structural support member 15 and/or frame 13. Structural support member 15 and/or frame 13 acts as a ground for the transfer of thrust loads and/or forces developed or generated by counter-rotating fan assembly 16 and/or booster compressor 24. Outer race 136 has a surface 137, generally opposing surface 133, which forms an outer groove 138 of thrust bearing assembly 130. At least one roller element, such as a plurality of rollers 139, is movably positioned between inner race 132 and outer race 136. Each roller 139 is in rolling contact with inner groove 134 and outer groove 138.

In one embodiment, a bearing assembly, such as roller bearing assembly 140, is positioned about the outer surface of cone extension 91 as shown in FIG. 2. Roller bearing assembly 140 is connected between cone 84 and cone extension 91. Roller bearing assembly 140 includes an inner race 142 that is mounted with respect to aft end 88. Inner race 142 is mounted to cone 84 so that inner race 142 is rotatable about longitudinal axis 11 with forward fan assembly 50. Inner race 142 has a surface 143 defining an inner groove 144 of roller bearing assembly 140.

Roller bearing assembly 140 includes an outer race 146 that is mounted with respect to cone extension 91 as shown in FIG. 2. Outer race 146 is mounted to cone extension 91 so that outer race 146 is rotatable about longitudinal axis 11 with aft fan assembly 52. Outer race 146 has a surface 147, generally opposing surface 143, which forms an outer groove 148 of roller bearing assembly 140. At least one roller element, such as a plurality of rollers 149, is movably positioned between inner race 142 and outer race 146. Each roller 149 is in rolling contact with inner groove 144 and outer groove 148 to facilitate relative rotational movement of cone 84, cone extension 91 and/or cone 90.

In this embodiment, roller bearing assemblies 130 and 140 facilitate providing rotational support to aft fan assembly 52 such that aft fan assembly 52 can rotate freely with respect to forward fan assembly 50. Accordingly, roller bearing assemblies 130 and 140 facilitate maintaining aft fan assembly 52 in a relatively fixed radial position within counter-rotating fan assembly 16. In alternative embodiments, any suitable bearing assembly known to those skilled in the art and guided by the teachings herein provided can be used for or in addition to bearing assembly 130 and/or bearing assembly 140.

In one embodiment, gearbox 100 is connected to a fixed or stationary component of gas turbine engine 10, such as frame 13 of core turbine engine 12, as shown in FIG. 2. Gearbox input 104 is rotatably coupled to second drive shaft 34 through drive shaft extension 112 that is splined to drive shaft 34. Gearbox output 106 is rotatably coupled to aft fan assembly 52 through an output structure 160. A first end of output structure 160 is splined to gearbox output 106 and a second end of output structure 160 is coupled to forward end 92 of disk 90 to facilitate driving aft fan assembly 52.

In one embodiment, gearbox 100 is located within a sump 170 at least partially defined between output structure 160, structure 13, and drive shaft 34. During operation, gearbox 100 is at least partially submerged within lubrication fluid contained in sump 170 to continuously lubricate gearbox 100 during engine operation.

The gas turbine engine assembly described herein includes a counter-rotating fan assembly having a geared single rotation low-pressure turbine. The assembly facilitates reducing at least some of the complexities associated with known counter-rotating low-pressure turbines. More specifically, the gas turbine engine assembly described herein includes a front fan assembly and a booster compressor that are each coupled to the low-pressure turbine via a drive shaft, and an aft fan assembly that is coupled to the low-pressure turbine via a gearbox. Moreover, during operation, the forward fan assembly and the booster compressor are driven at the same speed, which, in one embodiment, is approximately twice the rotational speed of the aft fan assembly. Additionally, the gas turbine engine assembly described herein is configured such that approximately 40% of power generated by the low-pressure turbine is transmitted through the gearbox to the aft fan assembly to facilitate reducing gear losses. Therefore, in the event of a gearbox failure, the aft fan assembly will cease to rotate. However, the front fan assembly and booster compressor will continue to rotate because the front fan assembly and booster compressor are each directly driven by the low-pressure turbine.

The above-described gas turbine engine assembly and methods of assembling the gas turbine engine assembly allow rotor thrust loads and/or forces generated by the counter-rotating fan assembly and/or the booster compressor to balance rotor thrust loads and/or forces generated by the low-pressure turbine. More specifically, the present invention includes a booster compressor that is not coupled to the aft fan assembly, rather the booster compressor is positioned axially aft of the fan frame assembly and coupled to a forward fan assembly such that the booster compressor rotates at the same rotational speed as the forward fan assembly. As a result, the speed of the aft fan assembly can be varied, by changing the gear ratio within the gearbox to facilitate increasing the operational performance and efficiency of the gas turbine engine assembly.

Exemplary embodiments of a gas turbine engine assembly and methods of assembly the gas turbine engine assembly are described above in detail. The assembly and method are not limited to the specific embodiments described herein, but rather, components of the assembly and/or steps of the method may be utilized independently and separately from other components and/or steps described herein. Further, the described assembly components and/or the method steps can also be defined in, or used in combination with, other assemblies and/or methods, and are not limited to practice with only the assembly and/or method as described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
    coupling a low-pressure turbine to a core turbine engine;
    coupling a single low-pressure turbine shaft to the low-pressure turbine;
    coupling a counter-rotating fan assembly including a forward fan assembly and an axially aft fan assembly to the low-pressure turbine via the single low-pressure turbine shaft such that the forward fan assembly rotates in a first direction and the aft fan assembly rotates in an opposite second direction; and
    coupling a booster compressor directly to the single low-pressure turbine shaft such that the booster compressor rotates in the first direction.

2. A method in accordance with claim 1 wherein the counter-rotating fan assembly includes a fan frame assembly, said method further comprising coupling the booster compressor to the forward fan assembly such that the booster compressor is positioned axially aft of the fan frame assembly.

3. A method in accordance with claim 1 wherein the counter-rotating fan assembly includes a fan frame assembly, said method further comprising coupling the booster compressor to the forward fan assembly such that the fan frame assembly is positioned axially between the booster compressor and the aft fan assembly.

4. A method in accordance with claim 1 further comprising:
    coupling a drive shaft between the low-pressure turbine and the forward fan assembly; and
    coupling a gearbox between the drive shaft and the aft fan assembly such that the aft fan assembly rotates in an opposite second direction than the forward fan assembly.

5. A method in accordance with claim 1 further comprising coupling a counter-rotating fan assembly including a forward fan assembly and a aft fan assembly to the low-pressure turbine such that the forward fan assembly and the booster compressor each rotate at a first rotational speed and the aft fan assembly rotates at a second rotational speed that is different than the first rotational speed.

6. A method in accordance with claim 5 further comprising coupling a counter-rotating fan assembly including a forward fan assembly and a aft fan assembly to the low-pressure turbine such that the forward fan assembly and booster compressor each rotate at a first rotational speed and the aft fan assembly rotates at a second rotational speed that is approximately one-half the first rotational speed.

7. A method in accordance with claim 4 wherein the gearbox is a toroidal shaped gearbox that substantially circumscribes the drive shaft, said method further comprising positioning the gearbox within an engine sump.

8. A counter-rotating fan assembly comprising:
    a forward fan assembly coupled to a low-pressure turbine via a single low-pressure turbine shaft, said forward fan assembly comprising a disk and a plurality of rotor blades coupled to said disk and configured to rotate in a first rotational direction;
    an aft fan assembly coupled to the low-pressure turbine via the single low-pressure turbine shaft, said aft fan assembly comprising a disk and a plurality of rotor blades coupled to said disk, said aft fan assembly configured to rotate in a second rotational direction; and
    a booster compressor coupled directly to the single low-pressure turbine shaft such that said booster compressor rotates in the first direction.

9. A counter-rotating fan assembly in accordance with claim 8 wherein said counter-rotating fan assembly further comprises a fan frame assembly that is coupled axially forward from said booster compressor.

10. A counter-rotating fan assembly in accordance with claim 8 wherein said counter-rotating fan assembly further comprises a fan frame assembly that is coupled between said aft fan assembly and said booster compressor.

11. A counter-rotating fan assembly in accordance with claim 8 further comprising:
    a drive shaft coupled between said low-pressure turbine and said forward fan assembly; and
    a gearbox coupled between said drive shaft and said aft fan assembly such that said aft fan assembly rotates in an opposite second direction than said forward fan assembly.

12. A counter-rotating fan assembly in accordance with claim 8 wherein said forward fan assembly and said booster compressor are configured to rotate at a first rotational speed and said aft fan assembly is configured to rotate at a second rotational speed that is different than the first rotational speed.

13. A counter-rotating fan assembly in accordance with claim 8 wherein said aft fan assembly is configured to rotate at a first rotational speed that is approximately one-half the rotational speed of said forward fan assembly and said booster compressor.

14. A counter-rotating fan assembly in accordance with claim 11 wherein said gearbox has a substantially toroidal cross-sectional profile and substantially circumscribes said drive shaft.

15. A turbine engine assembly comprising:
    a core gas turbine engine;
    a low-pressure turbine coupled to said core gas turbine engine;
    a single low-pressure turbine shaft coupled to said low-pressure turbine;
    a counter-rotating fan assembly coupled to said core gas turbine engine comprising:
        a forward fan assembly coupled to said low-pressure turbine via said single low-pressure turbine shaft, said forward fan assembly comprising a disk and a plurality of rotor blades coupled to said disk and configured to rotate in a first rotational direction; and
        an aft fan assembly coupled to the low-pressure turbine via said single low-pressure-turbine shaft, said aft fan assembly comprising a disk and a plurality of rotor blades coupled to said disk, said aft fan assembly configured to rotate in a second rotational direction; and
    a booster compressor coupled directly to said single low-pressure-turbine shaft such that said booster compressor rotates in the first direction.

16. A turbine engine assembly in accordance with claim 15 wherein said counter-rotating fan assembly further comprises a fan frame assembly that is coupled between said aft fan assembly and said booster compressor.

17. A turbine engine assembly in accordance with claim 15 further comprising:
    a drive shaft coupled between said low-pressure turbine and said forward fan assembly; and a gearbox coupled between said drive shaft and said aft fan assembly such that said aft fan assembly rotates in an opposite second direction than said forward fan assembly.

18. A turbine engine assembly in accordance with claim 15 wherein said forward fan assembly and said booster compressor are configured to rotate at a first rotational speed and said aft fan assembly is configured to rotate at a second rotational speed that is different than the first rotational speed.

19. A turbine engine assembly in accordance with claim 15 wherein said aft fan assembly is configured to rotate at a first rotational speed that is approximately one-half the rotational speed of said forward fan assembly and said booster compressor.

20. A turbine engine assembly in accordance with claim 17 wherein said gearbox has a substantially toroidal cross-sectional profile and substantially circumscribes said drive shaft.

* * * * *